Jan. 24, 1956 E. B. PASSOW ET AL 2,732,545
PILOT LIGHT SWITCH
Filed Dec. 1, 1953
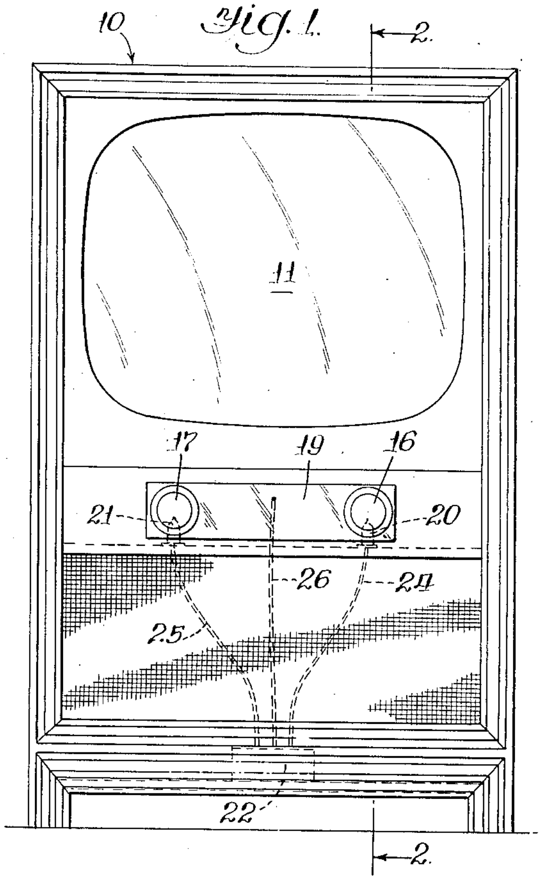
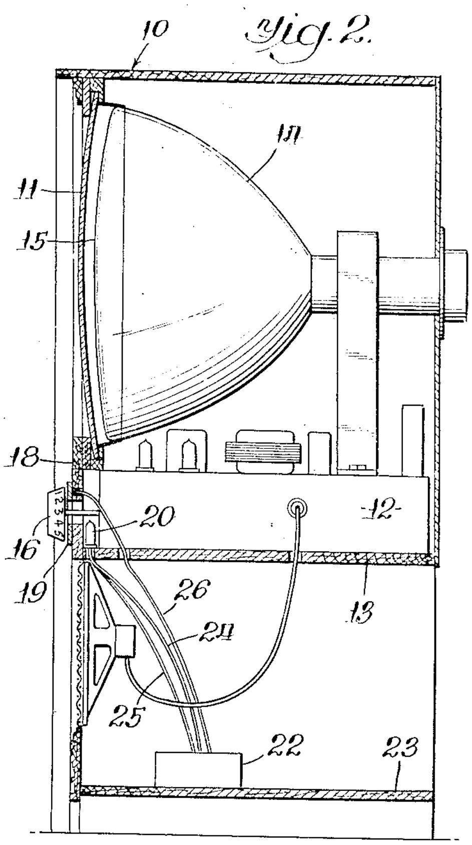
Fig. 1. Fig. 2.
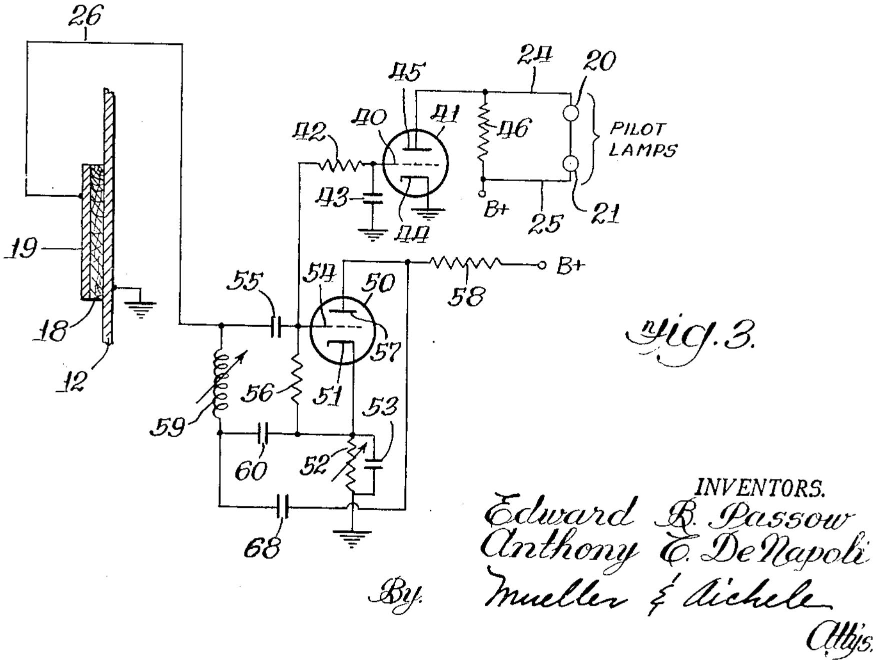
Fig. 3.
INVENTORS.
Edward B. Passow
Anthony C. DeNapoli
By Mueller & Aichele
Attys.

United States Patent Office 2,732,545
Patented Jan. 24, 1956

2,732,545

PILOT LIGHT SWITCH

Edward B. Passow, Park Ridge, and Anthony C. De Napoli, Mount Prospect, Ill., assignors to Motorola, Inc., Chicago, Ill., a corporation of Illinois Application December 1, 1953, Serial No. 395,372
4 Claims. (Cl. 340—258)

The present invention relates to pilot lamp systems for television receivers or the like, and more particularly to improved systems whereby a pilot lamp in a television receiver is energized automatically only during periods when it is actually needed.

For the greatest enjoyment of television programs, it is usual that such programs be viewed in a room in which the lights are dimmed if not entirely extinguished. Because of this, it is desirable that some type of pilot lamp arrangement be provided so that the receiver may be conveniently switched from one signal channel to another, or otherwise adjusted from time to time, with the various calibrations on the actuating or control knobs being illuminated. The use of a pilot lamp system creates certain problems, however, since it is obviously undesirable for the pilot lamp to be glowing continuously while a television program is being received as this would detract from the enjoyment of the program. The provision of a manually operated switch for energizing and de-energizing the pilot lamps results in an inconvenient system from an operation standpoint since it is necessary for the operator to grope for the pilot lamp switch when it is desired that the actuating knobs be illuminated.

It is, accordingly, an object of the present invention to provide an improved pilot light system for a television receiver or the like which does not require a manual switching operation and which operates automatically to energize one or more pilot lamps only during periods when they are needed.

A further object of the invention is to provide such an improved pilot light system whereby one or more pilot lamps associated with certain control knobs are energized whenever the hand of an operator approaches the control knobs to adjust the receiver and only for such periods.

A feature of the invention is the provision of a pilot lamp system for a television receiver, or the like, that includes an energizing circuit which is controlled to illuminate one or more pilot lamps whenever an operator grasps a control knob of the receiver.

Another feature of the invention is the provision of such an improved pilot lamp system for a television receiver or the like which utilizes the hand capacity of an operator to control an energizing circuit which, in turn, energizes one or more pilot lamps associated with the control knobs of the receiver.

The above and other features of the invention which are believed to be new are set forth with particularity in the appended claims. The invention itself, however, together with further objects and advantages thereof, may best be understood by reference to the following description when taken in conjunction with the accompanying drawing in which:

Fig. 1 is a front view of a television receiver incorporating the improved pilot lamp system of the present invention;

Fig. 2 is a side view of the receiver, partly in section taken along the lines 2—2 of Fig. 1; and Fig. 3 shows one embodiment of an energizing circuit for one or more pilot lamps and which is controlled in accordance with the present invention.

The invention is intended to be used in a television receiver having a manually operated control knob for effecting a desired adjustment of the receiver; and the invention includes a pilot lamp for illuminating the control knob, an energizing circuit for the pilot lamp including switching means for controlling the energization of the lamp, and a control device for actuating the switching means upon the actuation of the control knob.

Referring now to the drawings, and in particular to Figs. 1 and 2, these figures show a television receiver including a cabinet 10 and a usual viewing screen 11. A metallic, grounded television chassis 12 is mounted on a wooden shelf 13 within a wooden cabinet 10, and the chassis includes a cathode ray image reproducing device 14 having a fluorescent screen 15 facing the viewing screen 11 of the receiver. The receiver also includes a pair of control shafts which extend from chassis 12 through respective enlarged apertures in the wooden front wall 18 of cabinet 10 and which also extends through respective enlarged apertures in a metallic escutcheon plate 19 secured to the front panel. The control shafts have a pair of control knobs, or actuating dials, 16, 17 respectively mounted on their outer ends, and the arrangement is such that the control shafts are spaced from and out of electrical contact with the metallic escutcheon plate 19. When so desired, plate 19 need not extend beyond the knobs 16, 17 but merely be disposed between the knobs with the associated control shafts thereof extending only through the front wall 18.

Control knob or actuating dial 16, for example, may constitute the station selector for the receiver and is composed of any suitable translucent material with calibrated numerals inscribed thereon corresponding to the various signal channels. Control knob 17, which also may be composed of any suitable translucent material, may be of the dual type and serve to control sound volume and picture brightness, in accordance with well known practice.

A pair of pilot lamps 20, 21 is mounted on shelf 13 with the lamps being disposed respectively back of panel 18 adjacent the apertures through which the control shafts of knobs 16 and 17 extend. In this manner, illumination of lamps 20 and 21 causes the control knobs 16 and 17 to glow due to their translucent characteristics, with the light from the lamps being transmitted to the control knobs through the enlarged apertures in the front panel 18 and escutcheon plate 19.

The system also includes an electronic relay unit 22 which includes an energizing circuit for the pilot lamps and which may be mounted on a bottom shelf 23 within cabinet 10. Lamps 20 and 21 are connected to unit 22 by way of leads 24, 25, and the metallic escutcheon plate 19 is connected thereto by way of lead 26.

A suitable circuit for unit 22 is shown in Fig. 3, and this circuit includes an electron discharge device 50 which may be of the triode type. Device 50 has a cathode 51 connected to ground through a variable resistor 52 shunted by a capacitor 53. Lead 26 from escutcheon plate 19 is coupled to the control electrode 54 of device 50 through a coupling capacitor 55, and the control electrode is connected to the cathode through a resistor 56. The anode 57 of device 50 is connected through a resistor 58 to the positive terminal B+ of a source of unidirectional potential, and the anode is coupled to the junction of lead 26 and capacitor 55 through a capacitor 68 and variable inductance coil 59. Coil 59 is coupled to the junction of resistors 52 and 56 through a capacitor 60.

Control electrode 54 of device 50 is connected to the control electrode 40 of an electron discharge device 41 through a resistor 42, the latter control electrode being coupled to ground through a capacitor 43. The cathode 44 of device 41 is connected to ground and the anode 45 of that device is connected to the positive terminal B+ through a resistor 46. Pilot lamps 20 and 21 are connected in series across resistor 46 and are connected to the respective ends thereof through leads 24, 25.

The escutcheon plate 19 is insulated from the grounded chassis 12 by a portion of the front wall 18 of cabinet 10. The cabinet is composed of wood so that the metallic escutcheon plate 19 forms a capacitive element with respect to chassis 12 and, therefore, with respect to a point of reference potential or ground. In this manner, plate 19 exhibits a certain capacity with respect to the point of reference potential or ground, and this capacity is varied by the proximity of an extraneous body, such as the hand of an operator as it approaches either of the dials or knobs 16 and 17.

The circuit of device 50 is connected as a modified Colpitts oscillator and has a selected frequency, determined by the values of inductance coil 59 and capacitors 60 and 68, which produces an oscillating output signal on control electrode 54 of optimum amplitude. The frequency of the oscillator, however, is altered slightly by the shunting effect of plate 19 across coil 59 due to the capacity of this plate to ground. This slight capacity of plate 19 changes the oscillator frequency a small amount from the frequency established by the elements 68, 59 and 60, so that the amplitude of the oscillating output signal is decreased slightly from its optimum value.

The oscillator includes a self-biasing network including capacitor 55 and resistor 56, and this network causes the bias on control electrode 54 to be negative relative to ground and to be a function of the amplitude of the oscillating signal produced by the oscillator. This negative bias potential appears across resistor 56 connected between the control electrode 54 and cathode 51. At the same time, the current flow through device 50 produces a positive bias potential across cathode resistor 52, but the circuit is constructed so that the negative bias potential across resistor 56 is greater than the positive bias across resistor 52.

Resistor 42 and capacitor 43 function as a filter for the output oscillating signal, and only the net bias potential between control electrode 54 and ground is applied to control electrode 40 of device 41. When the oscillator is oscillating at or near its selected frequency, this net bias potential is sufficiently negative to render device 41 nonconductive. Under these conditions there is zero voltage drop across resistor 46 and pilot lamps 20, 21 are extinguished. Resistor 52 is made variable so that the circuit can be controlled to a point where device 45 is just past its cut-off point under these conditions so that the pilot lamps 20, 21 are extinguished but may be readily ignited should the negative bias on device 40 drop.

The approach of an extraneous body to escutcheon plate 19 increases the capacity of the plate to ground and, therefore, increases the capacity shunting inductance coil 59. This change causes the oscillator frequency to vary further from its selected value, and this causes a resulting decrease in the amplitude of the oscillating signal on control electrode 54 with a corresponding decrease in the negative bias potential across resistor 56. The positive bias potential across resistor 52 is also decreased, but to a more limited extent than the decrease in negative bias potential across resistor 56. The decrease in negative bias potential across resistor 56 is sufficient to cause device 41 to become conductive thereby energizing lamps 20, 21 due to the increased potential drop across resistor 46. This energization of the pilot lamps continues only so long as the extraneous body, such as the hand of an operator, is in the vicinity of plate 19. As soon as the hand is removed, the oscillator recovers its initial condition and the lamps become de-energized.

The invention provides, therefore, a simple pilot lamp switching system by means of which the actuating dials or knobs of a television receiver or the like may be illuminated only when illumination is desired, and may be automatically extinguished at all other times.

While the illustrated embodiment of the invention shows the energizing circuit for the pilot lamps as being controlled by a capacitive element whose capacitive value varies upon the approach of an extraneous body, it is apparent that other control means could be used. For example, a photo-electric cell could be used with the hand of an operator breaking a sensitizing ray to this cell to achieve the desired control effect. Moreover, mechanical switching means can be employed that respond to the grasping of the control knob, and the resultant slight toggling of its control shaft, to actuate the energizing circuit for the pilot lamps. Therefore, while a particular embodiment of the invention has been shown and described, modifications can be made, and it is intended in the appended claims to cover all such modifications as fall within the true spirit and scope of the invention.

We claim:

1. In a television receiver having a cabinet with a front panel therefor, a chassis supported within the cabinet, a control shaft extending from the chassis through an enlarged aperture in the front panel, and a translucent control knob mounted on the shaft on the side of the front panel remote from the chassis, the combination of, a pilot lamp for illuminating the control knob mounted within the cabinet adjacent the aperture in the front panel, a metallic plate mounted on the front panel on the side thereof remote from the chassis and adjacent said control knob and subject to exhibit capacity variations with respect to a point of reference potential upon the grasping of said knob by the hand of an operator, an energizing circuit for said pilot lamp including switching means for controlling the energization of said lamp, an oscillator coupled to said energizing circuit for actuating said switching means in response to frequency variations of said oscillator from a selected frequency, and means for coupling said metallic plate to said oscillator to produce frequency variations thereof from said selected frequency in response to such changes in the capacity of said plate with respect to said point of reference potential, thereby to cause said pilot lamp to be energized when the hand of the operator grasps said control knob and to be de-energized upon the withdrawal of the hand.

2. In a television receiver having a cabinet with a front panel therefor and further having a chassis supported within the cabinet, a combination of a control shaft extending from the chassis through an aperture in the front panel, a tuning knob mounted on the control shaft on the side of the front panel remote from the chassis, a translucent channel indicator, at least one pilot lamp for illuminating the channel indicator and mounted adjacent the indicator to provide illumination therethrough, control means actuated whenever said tuning knob is grasped by the hand of an operator and said tuning shaft is rotated thereby for all angular positions of said tuning shaft, an energizing circuit for said pilot lamp including switch means for controlling the energization thereof, an actuating means for said energizing circuit controlled by said control means for operating said switch whenever said tuning knob is grasped by the hand of an operator and said tuning shaft is rotated thereby at any angular position of said shaft, thereby to cause said pilot lamp to be energized when the hand of the operator grasps said control knob and rotates said control shaft and to cause said pilot lamp to be de-energized upon the withdrawal of the operator's hand.

3. In a television receiver having a cabinet with a front panel therefor, and further having a chassis supported within the cabinet, a combination of a control shaft extending from the chassis through an aperture in the front panel, a tuning knob mounted on the shaft on the side of the front panel remote from the chassis, a translucent channel indicator, at least one pilot lamp for illuminating the channel indicator and mounted adjacent the indicator to provide illumination therethrough, a metallic member mounted adjacent said tuning knob and subject to exhibit capacity variations with respect to a point of reference potential upon the grasping of said knob by the hand of an operator, an energizing circuit for said pilot lamp including switching means for controlling the energization thereof, an oscillator coupled to said energizing circuit for actuating said switching means in response to frequency variations of said oscillator from a selected frequency, and means coupling said metallic member to said oscillator to produce frequency variations thereof from said selected frequency in response to such changes of capacity of said metallic member with respect to said point of reference potential due to the hand of the operator, thereby to cause said pilot lamp to be energized when the hand of the operator grasps said control knob and to be de-energized upon the withdrawal of the operator's hand.

4. In a television receiver having a cabinet with a front panel therefor and further having a chassis supported within the cabinet, the combination of a control shaft extending from the chassis through an aperture in the front panel, a tuning knob mounted on the shaft on the side of the front panel remote from the chassis, a translucent channel indicator, at least one pilot lamp for illuminating the channel indicator and mounted adjacent the indicator to provide illumination therethrough, a metallic member mounted adjacent said tuning knob and subject to exhibit capacity variations with respect to a point of reference potential upon the grasping of said knob by the hand of an operator, an energizing circuit for said pilot lamp including switching means for controlling the energization thereof, control means coupled to said energizing circuit for actuating said switching means in response to capacity variations of said metallic member, and means coupling said metallic member to said control means thereby to cause said pilot lamp to be energized when the hand of the operator grasps said control knob and to be de-energized upon the withdrawal of the hand.

References Cited in the file of this patent

UNITED STATES PATENTS

| | | |
|---|---|---|
| 2,186,825 | Dome | Jan. 9, 1940 |
| 2,386,942 | Edelman | Oct. 16, 1945 |
| 2,457,920 | Rider | Jan. 4, 1949 |
| 2,525,767 | Bruns | Oct. 17, 1950 |
| 2,553,729 | St. Marie | May 22, 1951 |
| 2,560,312 | Tellier | July 10, 1951 |
| 2,606,239 | Beste | Aug. 5, 1952 |